Feb. 23, 1954 W. A. WELDEN 2,670,107
TEAKETTLE HAVING A MANUALLY OPERATED
LID FOR THE POURING OPENING
Filed April 9, 1948 3 Sheets-Sheet 2

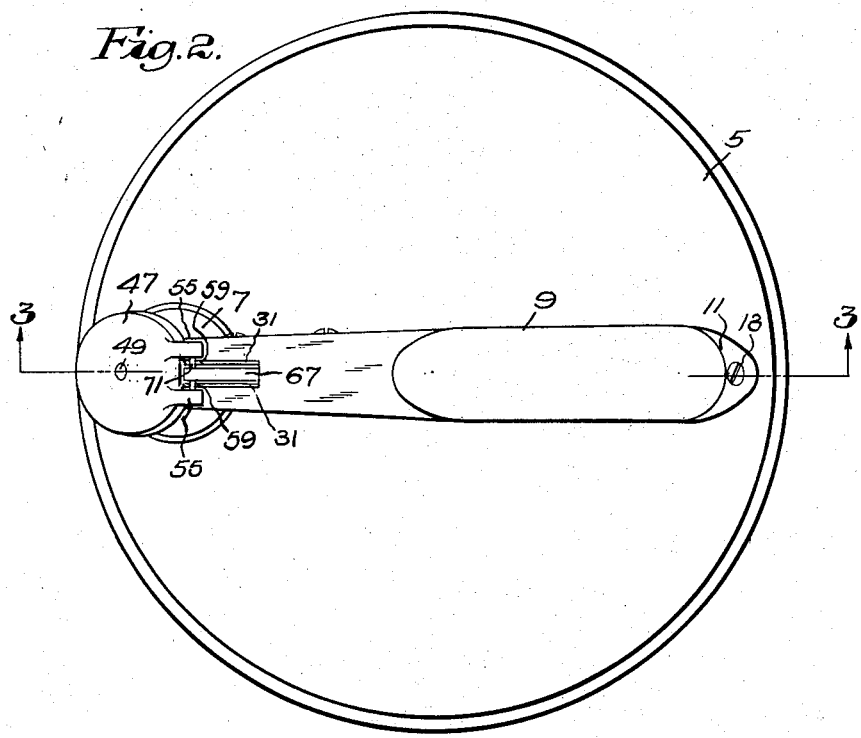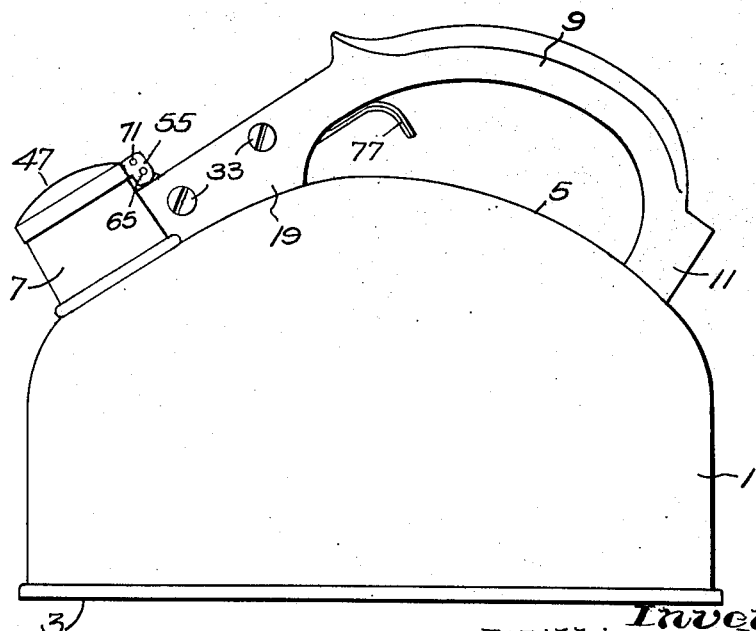

Inventor:
William A. Welden

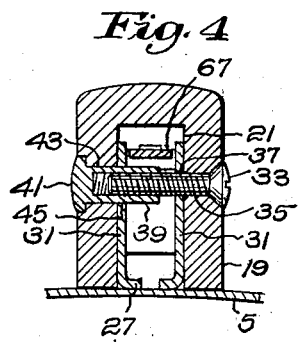

Patented Feb. 23, 1954

2,670,107

UNITED STATES PATENT OFFICE 2,670,107

TEAKETTLE HAVING A MANUALLY OPERATED LID FOR THE POURING OPENING

William A. Welden, Stamford, Conn., assignor to Revere Copper and Brass Incorporated, Rome, N. Y., a corporation of Maryland Application April 9, 1948, Serial No. 19,980

4 Claims. (Cl. 222—474)

My invention relates to teakettles.

The invention, which has among its objects the provision of a teakettle having improved means for controlling the pouring opening, will be best understood from the following description when read in the light of the accompanying drawing of a specific embodiment of the invention selected for illustrative purposes, while the scope of the invention will be more particularly pointed out in the appended claims.

In the drawings:

Fig. 1 is a side elevation of a teakettle according to the invention;

Fig. 2 is a plan view of the teakettle according to Fig. 1;

Fig. 4 is a section on the line 4—4 of Fig. 3;

Fig. 5 is a side elevation of the U-shaped bracket member of Figs. 3 and 4;

Fig. 6 is an end view of the bracket member according to Fig. 5;

Fig. 7 is a plan of the lid of the spout according to Figs. 1, 2 and 3;

Fig. 8 is a side elevation of the lid according to Fig. 7;

Fig. 9 is a bottom view of the lid according to Figs. 7 and 8;

Fig. 10 is a plan of the operating member for the lid of the spout; and

Fig. 11 is a side elevation of the lid operating member according to Fig. 10.

Figure 3:
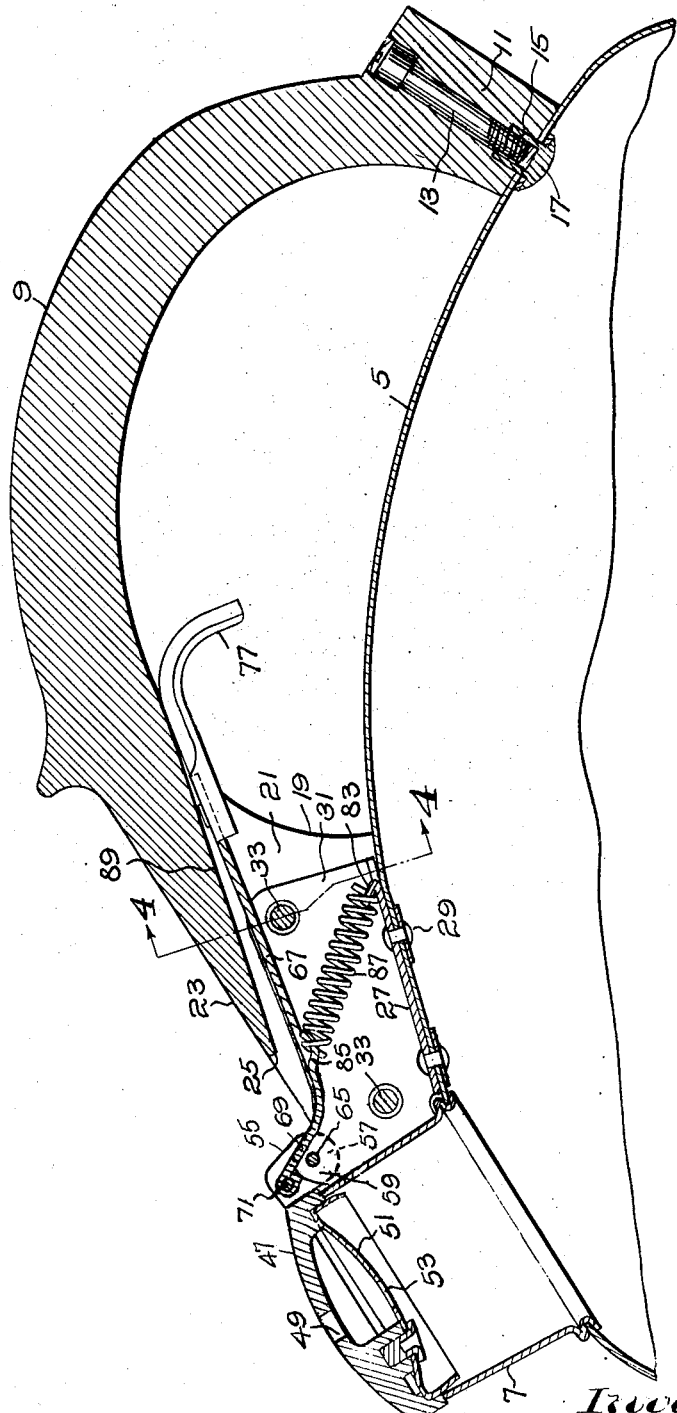
Fig. 3 is a section on the line 3—3 of Fig. 2, on an enlarged scale.

The teakettle illustrated comprises a container having the side walls 1, bottom walls 3, and dome-shaped top wall 5. Adjacent one side of the container the top wall is provided with a spout 7, which may be employed for filling the teakettle and pouring its contents.

As illustrated, the container is provided with a handle having a body portion 9 which serves as a hand grip. At one end this body portion is integrally formed with an end portion 11, resting upon the container top wall and removably secured thereto by a screw 13. This screw, as shown, is threaded into the shank portion 15 of a nut, the head 17 of which nut is shown as positioned at the under side of the container top wall and is welded or otherwise suitably secured thereto, while the shank extends from the head through a perforation in the container top wall into an aligned perforation in the handle end member 11.

At its end opposite its end member 11 the handle is shown as provided with an end member 19 resting upon the container top wall, this end member 19 laterally abutting with the side of the spout 7. As shown, the handle end member 19 is formed with a downwardly opening slot 21 which intersects the top surface 23 of the handle adjacent the spout to form an upper opening 25. Received in this slot is a U-shaped bracket having a web 27 resting upon the container top wall 5 and secured thereto by rivets 29. At its opposite longitudinal edges this web carries upstanding flanges 31 which fit the side walls of the slot 21 of the handle. As shown, the handle end member 19 is removably secured to the U-shaped bracket by screws 33 extending through aligned perforations 35 and 37 formed in the handle and one of the flanges 31, respectively, these screws being threaded into the shank portions 39 of the headed nuts 41, which shank portions extend through aligned perforations 43 and 45 formed in the handle and the other of the flanges 31, respectively.

As illustrated, the spout 7 is provided with a lid 47, preferably formed of light weight molded plastic, having a central opening 49 for escape of steam and the like from the interior of the container. If desired, the lid at its under side may carry a thin walled metallic member 51 formed with a central opening 53 so that the lid will constitute a whistle.

As shown, the lid 47 is integrally formed with a pair of spaced lateral projections 55 having downwardly extending portions 57. Received between the pair of downwardly extending portions are the upstanding ears 59 formed on the adjacent portions of the flanges 31 of the U-shaped bracket, the ears extending through the opening 25 in the handle. As shown, the projecting portions 55, 57 of the lid, and the ears 59 of the U-shaped bracket, are formed with aligned perforations 61 (Fig. 8) and 63 (Fig. 5), respectively, through which extends a pin 65 for mounting the lid upon the bracket for swinging about a horizontal axis.

Received in the slot 21 of the handle is shown an operating member 67 for the lid 47. This operating member has an upwardly turned portion 69 which is received between the projections 55, 57 of the lid and is secured thereto for swinging about a horizontal axis by a pin 71, the pin extending through a perforation 73 (Fig. 11) formed in the operating member and perforations 75 (Fig. 8) formed in the lid in alignment with the perforation 73. The operating member 67 extends from the lid through the slot 21 in the handle and between the flanges 31 of the U-shaped bracket to the space between the body portion 9 of the handle and the container top wall 5. In this space it is provided with a finger grip 77, this finger grip being formed as part of a light weight molded member of plastic having a base portion 79 secured by a rivet 81 to the body portion of the operating member, which body portion is preferably formed of metal.

As illustrated, the web 27 of the U-shaped bracket is struck up to form an upwardly projecting lug 83, while the body portion of the lid operating member 67 is struck up to form a downturned hook-like lug 85. Extending between these lugs is a compression spring 87, the lug 83 fitting into the lower end of this spring and the lug 85 being bent for securing the opposite end of the spring to the operating member. This spring, as clearly illustrated in Fig. 3, is arranged in oblique position so that it tends to force the operating member toward the lid 47 to swing the lid about its pivotal axis and thus hold the lid in closed position and urge it into that position when the operating member is retracted for opening the lid. The operating member is also normally held by the spring 87 in contact with the downwardly facing surface 89 presented by the top of the slot 21 of the handle and contiguous under-surface of the handle body portion 9. This holds the finger grip in proper position to be engaged by the finger of the hand which grasps the handle portion 9 and permits the finger grip to swing downward about its pivotal connection to the lid when such finger retracts the operating member for opening the lid, resulting in the lid being opened without any binding action. Further, it causes the spring to so act on the operating member as to hold the lid securely closed, it being observed that in the position of parts illustrated by Fig. 3 the rearward portion of the operating member is in effect fulcrumed against the handle, while the spring tends to force it upward and to the left about such fulcrum so as to hold the lid closed. It will also be observed that downward excess movement of the lid operating member will be prevented by reason of the right hand screw 33 of Fig. 3 being positioned below it in slightly spaced relation thereto. Preferably the contact between the downwardly facing surface of the handle and the operating member is at the point on the latter illustrated by Fig. 3, although satisfactory results may be secured if such contact occurs anywhere along the operating member from its point of connection to the spring to its free end.

It will be understood that within the scope of the appended claims wide deviations may be made from the form of the invention described without departing from the spirit of the invention.

I claim:

1. A teakettle comprising a container having a pouring opening, a lid for said opening operatively pivoted to said container for vertical swinging movement relative to such opening, a handle for the teakettle having a portion above the container in spaced relation thereto, an operatively rigid longitudinally reciprocable operating member for said lid connected thereto for swinging movement in a vertical plane relative thereto, said operating member having a finger grip in the space between said handle portion and said container, an upwardly facing surface portion of said operating member spaced from said lid being adapted slidably and swingingly to removably bear against a downwardly facing surface presented by said handle, and a spring acting on said operating member at a point longitudinally thereof between said upwardly facing surface portion thereof and said lid for urging said member longitudinally toward said lid and to swing upwardly about its connection to said lid, so as normally to cause said upwardly facing surface portion to bear against said downwardly facing surface and said member to be urged by the spring to slide over said downwardly facing surface toward the lid and simultaneously to be urged by the spring to swing upwardly about said downwardly facing surface as a fulcrum; the connection of said operating member to said lid being radially spaced from the axis of swinging of said lid and being operatively above said axis when said lid closes said opening.

2. A teakettle comprising a container having a pouring opening, a lid for said opening operatively pivoted to said container for vertical swinging movement relative to such opening, a handle for the teakettle having a portion above the container in spaced relation thereto, an operatively rigid longitudinally reciprocable operating member for said lid connected thereto for swinging movement in a vertical plane relative thereto, said operating member having a finger grip in the space between said handle portion and said container, an upwardly facing surface portion of said operating member spaced from said lid being adapted slidably and swingingly to removably bear against a downwardly facing surface presented by said handle, and a compression spring housed by said handle acting on said operating member at a point longitudinally thereof between said upwardly facing surface portion thereof and said lid for urging said member longitudinally toward said lid and to swing upwardly about its connection to said lid, so as normally to cause said upwardly facing surface portion to bear against said downwardly facing surface and said member to be urged by the spring to slide over said downwardly facing surface toward the lid and simultaneously to be urged by the spring to swing upwardly about said downwardly facing surface as a fulcrum; the connection of said operating member to said lid being radially spaced from the axis of swinging of said lid and being operatively above said axis when said lid closes said opening.

3. A teakettle according to claim 1 in which the handle has a portion secured to the container at one side of the pouring opening, which portion houses the spring and has an opening through which the operating member extends to the lid.

4. A teakettle according to claim 1 in which the container carries a U-shaped bracket having a web secured to said container and has upstanding flanges at each of opposite sides of said web, the lid being pivotally secured to said flanges, the handle having an end portion adjacent the pouring opening formed with a slot receiving said bracket and housing the spring, means securing said end portion of said handle to said flanges for securing that portion to the container, the operating member for said lid extending through said slot and between said flanges to said lid.

WILLIAM A. WELDEN.

References Cited in the file of this patent

UNITED STATES PATENTS

| Number | Name | Date |
| --- | --- | --- |
| 1,157,910 | Tomsky | Oct. 26, 1915 |
| 2,147,230 | Anschicks | Feb. 14, 1939 |
| 2,490,194 | Barclay | Dec. 6, 1949 |

FOREIGN PATENTS

| Number | Country | Date |
| --- | --- | --- |
| 518,114 | Great Britain | Feb. 19, 1940 |